(12) United States Patent
Vicenik et al.

(10) Patent No.: US 12,392,716 B2
(45) Date of Patent: Aug. 19, 2025

(54) METHOD FOR REMOTE DETECTION OF GASEOUS SUBSTANCES IN THE ATMOSPHERE BY THE DIAL SYSTEM WITH TWO LASERS AND A REMOTE DETECTOR

(71) Applicant: SEC TECHNOLOGIES, S.R.O., Liptovsky Mikulas (SK)

(72) Inventors: Jiri Vicenik, Liptovsky Mikulas (SK); Zina Sedlackova, Liptovsky Mikulas (SK)

(73) Assignee: SEC TECHNOLOGIES, S.R.O., Liptovsky Mikulas (SK)

( * ) Notice: Subject to any disclaimer, the term of this patent is extended or adjusted under 35 U.S.C. 154(b) by 372 days.

(21) Appl. No.: 17/917,154

(22) PCT Filed: Apr. 7, 2021

(86) PCT No.: PCT/SK2021/000002
§ 371 (c)(1),
(2) Date: Oct. 5, 2022

(87) PCT Pub. No.: WO2021/206640
PCT Pub. Date: Oct. 14, 2021

(65) Prior Publication Data
US 2023/0160814 A1 May 25, 2023

(30) Foreign Application Priority Data

Apr. 7, 2020 (SK) .................................. 35-2020
Apr. 7, 2020 (SK) .................................. 49-2020 U

(51) Int. Cl.
*G01N 21/17* (2006.01)
*G01N 21/3504* (2014.01)
*G01N 21/39* (2006.01)

(52) U.S. Cl.
CPC ......... *G01N 21/3504* (2013.01); *G01N 21/39* (2013.01); *G01N 2021/1755* (2013.01);
(Continued)

(58) Field of Classification Search
CPC ....... G01N 2201/068; G01N 2021/394; G01N 2021/795; G01N 2021/3513;
(Continued)

(56) References Cited

U.S. PATENT DOCUMENTS 4,291,988 A * 9/1981 Dixon, Jr. ............ G01N 21/031
356/437
4,450,356 A * 5/1984 Murray .................. G01N 21/39
250/338.5

(Continued)

FOREIGN PATENT DOCUMENTS

EP 0103422 3/1984
JP 2004258173 A * 9/2004
(Continued)

OTHER PUBLICATIONS

Kolsch H J et al, "Simultaneous NO and NO2 Dial Measurement Using BBO Crystals", Applied Optics, Optical Society of America, Washington, DC, US, vol. 28, No. 11, Jun. 1989 (Jun. 1989), p. 2052-2056.
(Continued)

*Primary Examiner* — Isiaka O Akanbi
(74) *Attorney, Agent, or Firm* — Lee & Hayes, P.C.

(57) ABSTRACT

A system and method for remote detection of gaseous substances by a DIAL system includes causing a laser beam generated by a first laser to impinge on a semipermeable mirror, wherein 50% of the laser beam power passes through the semipermeable mirror and proceeds through a first aperture towards a target, wherein a remaining 50% of the laser beam power reflects from the semipermeable mirror
(Continued)

and impinges on a reflecting mirror from which it is reflected. The method may also include causing a delayed laser beam generated by a second laser to impinge on the semipermeable mirror, wherein 50% of the laser beam power passes through the semipermeable mirror and impinges on the reflecting mirror from which it is reflected and is directed through the second aperture to the target and at the same time a remaining 50% of the laser beam power reflects from the semipermeable mirror.

8 Claims, 1 Drawing Sheet

(52) U.S. Cl.
CPC ............... *G01N 2021/1795* (2013.01); *G01N 2021/394* (2013.01)

(58) Field of Classification Search
CPC ..... G01N 2021/06113; G01N 21/3504; G01N 21/39; G01N 21/3151; G01N 21/255; G01S 17/00; G01S 17/023; G01S 7/4818
USPC .................................................. 356/432–440
See application file for complete search history.

(56) References Cited

U.S. PATENT DOCUMENTS

| | | | | |
|---|---|---|---|---|
| 5,015,099 A | * | 5/1991 | Nagai | G01N 21/39 250/338.5 |
| 5,157,257 A | * | 10/1992 | Geiger | G01S 17/95 250/338.5 |
| 5,250,810 A | * | 10/1993 | Geiger | G01S 7/483 250/338.5 |
| 5,767,519 A | * | 6/1998 | Gelbwachs | G01N 21/3504 250/338.5 |
| 6,822,742 B1 | * | 11/2004 | Kalayeh | G01N 21/3504 356/432 |
| 8,269,971 B1 | * | 9/2012 | Marsh | G01N 21/3504 356/432 |
| 8,345,250 B1 | * | 1/2013 | Janosky | G01S 7/4817 250/338.5 |
| 2006/0268947 A1 | * | 11/2006 | Kalayeh | G01N 21/3504 372/20 |
| 2007/0040121 A1 | * | 2/2007 | Kalayeh | G01S 17/88 250/342 |
| 2017/0089829 A1 | * | 3/2017 | Bartholomew | G01S 7/499 |
| 2019/0376890 A1 | * | 12/2019 | Bennett | G06T 7/73 |

FOREIGN PATENT DOCUMENTS

| | | |
|---|---|---|
| RU | 200925 U1 * | 11/2020 |
| SK | 282472 | 2/2002 |
| SK | 32013 | 10/2014 |

OTHER PUBLICATIONS

Sherstov, et al. "Two-channel CO2 laser system for heterodyne applications", Proceedings of SPIE : Eleventh International Symposium on Atmospheric and Ocean Optics/Atmospheric Physics, vol. 5743, 2004, 10 pages.

* cited by examiner

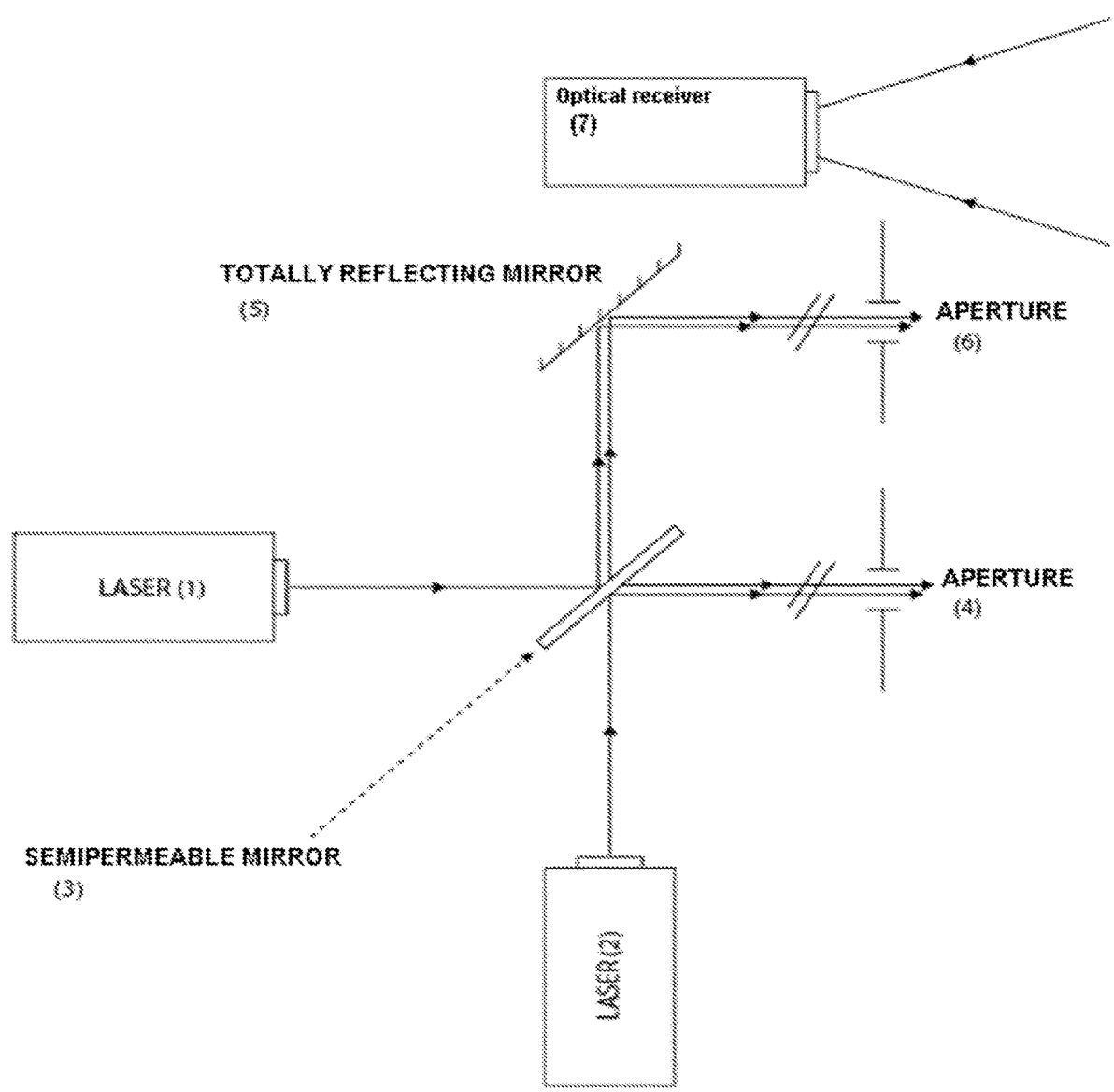

METHOD FOR REMOTE DETECTION OF GASEOUS SUBSTANCES IN THE ATMOSPHERE BY THE DIAL SYSTEM WITH TWO LASERS AND A REMOTE DETECTOR

RELATED APPLICATIONS

This application is a national stage application of international patent application PCT/SK2021/000002, filed Apr. 7, 2021, which claims priority to Slovakia Patent Application No. PP 35-2020, filed Apr. 7, 2020, and to Slovakia Patent Application No. PUV 49-2020, filed Apr. 7, 2020, all of which are hereby incorporated by reference in their entirety.

TECHNICAL FIELD

The invention relates to a method for the remote detection of gaseous substances in the atmosphere by a DIAL system with two lasers and to the construction of a remote detector of gaseous substances in the atmosphere using the DIAL (Differential Absorption LIDAR) technology with two lasers. The invention falls within the field of laser systems.

BRIEF DESCRIPTION OF THE DRAWINGS

FIG. 1 illustrates a device that may utilize the disclosed method for remote detection of gaseous substances in the atmosphere by the DIAL system with two lasers and a remote detector of gaseous substances in the atmosphere according to the invention is shown in the FIGURE of the accompanying drawing.

BACKGROUND OF THE INVENTION

The so-called "classic" arrangement of the DIAL system with two lasers has a single output aperture, where the laser beams from both lasers are merged by means of a semipermeable mirror so that they are coaxial. Therefore, the laser radiation from both lasers propagates towards the target—object that ends a particular measuring route, through the identical volume of the atmosphere. The obvious disadvantage of this arrangement is the 50% loss of energy from the lasers arising from the merging of beams (although this 50% of energy is used to synchronize the system and measure outgoing energies) which has a negative effect on the remote detector range, as its range drops to about 70%. If the output aperture is accidentally blocked, such DIAL system fails.

There is a DIAL system arrangement with two lasers and two output apertures, where each laser has a separate output aperture. In practice, there are for instance the DD-CWA and the F4G systems operating on this basis. As a result, the laser radiation from one laser propagates to the target to a certain distance through a different volume of the atmosphere than the radiation from the other laser. The laser beams gradually overlap, but they usually get coincident to about 50% on a halfway towards the target. The influence of optical atmospheric effects, the different aerosol content and also the different concentrations of the detected substance for one and the other laser in the initial part of the measuring route can fundamentally negatively affect the minimum detectable concentration. If one of the output apertures of such DIAL is accidentally blocked for a short period of time, it may either cause false detection or prevent the detection of the real cloud of substance to be detected.

SUMMARY OF THE INVENTION

The method for remote detection of gaseous substances in the atmosphere by the DIAL system with two lasers according to the invention largely eliminates these drawbacks, the essence of which consists in that the laser beam generated by the first laser impinges on a semipermeable mirror, where 50% of the laser beam power passes through the semipermeable mirror and proceeds through the first aperture towards the target and at the same time the remaining 50% of the laser beam power reflects from the semipermeable mirror, impinges on a totally reflecting mirror from which it is reflected and is directed through the second aperture to the same target. The delayed laser beam generated by the second laser impinges on the semipermeable mirror, where 50% of the laser beam power passes through the semipermeable mirror, impinges on the totally reflecting mirror from which it is reflected and is directed through the second aperture to the same target and at the same time the remaining 50% of the laser beam power reflects from the semipermeable mirror and proceeds through the first aperture towards the same target.

In essence, the laser beams from both lasers are merged by a semipermeable mirror, each beam being divided into two, each carrying 50% of the energy from the first and then also the second laser, and both beams are directed in parallel, one by semipermeable and the other one by totally reflecting mirror to the target.

The above stated method for remote detection of gaseous substances in the atmosphere by the DIAL system with two lasers is usable in a remote detector of gaseous substances in the atmosphere according to the invention, the essence of which is based on the presence of the first laser and the second laser, while at the intersection of the axes of their laser beams a semipermeable mirror is located. Behind the semipermeable mirror, a totally reflecting mirror is located in the forward direction of the laser beam advance generated by the second laser and also in the reflected direction from the semipermeable mirror of the laser beam advance generated by the first laser. The first aperture is located in a forward direction from the semipermeable mirror of the 50% laser beam advance from the first laser and of the reflected 50% laser beam advance from the second laser. The second aperture is located in the reflected direction from the totally reflecting mirror of the 50% laser beam advance from the first laser and of the 50% laser beam advance from the second laser.

The advantages of the method for remote detection of gaseous substances in the atmosphere by the DIAL system with two lasers and the construction of the remote detector of gaseous substances in the atmosphere according to the invention are evident from the effects which are manifested externally. The originality of the solution lies in the fact that by merging beams from both lasers using semipermeable mirror and at the same time by dividing each beam into two, each carrying 50% of energy from the first and then also the second laser, where both beams are directed in parallel to the target, there is no 50% loss of energy of lasers and therefore no decrease in the range of the DIAL and laser radiation from both lasers passes through the same volumes of atmosphere. Such arrangement of the DIAL system with two lasers with the division of laser beams into two minimizes the external influences of atmospheric effects on detection and ensures the maximum detection range. The solution with two output apertures brings other advantages here. One advantage is that even if one of the apertures is completely blocked, the range of the system will decrease, but the detection capability and DIAL sensitivity will be preserved. The second advantage is that division the laser beams into two will bring the power density reduction in the output apertures and thus vision safety increase, because although the total energy coming from the aperture remains approximately the same, it is divided into two pulses: the first from the first laser, and after a significant delay the second from the second laser.

Example of Embodiment

In this example of a specific embodiment of the subject of the invention, a solution of a method for remote detection of gaseous substances in the atmosphere by the DIAL system with two lasers according to the invention is described. The method for remote detection is applied to a remote detector of gaseous substances in the atmosphere. It is based on the fact that the laser beam generated by the first laser impinges on a semipermeable mirror, where 50% of the laser beam power passes through the semipermeable mirror and proceeds through the first aperture towards the target and at the same time the remaining 50% of the laser beam power reflects from the semipermeable mirror, impinges on a totally reflecting mirror from which it is reflected and is directed through the second aperture to the same target. The delayed laser beam generated by the second laser impinges on a semipermeable mirror, where 50% of the laser beam power passes through the semipermeable mirror, impinges on a totally reflecting mirror from which it is reflected and is directed through the second aperture to the same target and at the same time the remaining 50% of the laser beam power reflects from the semipermeable mirror and proceeds through the first aperture towards the same target.

In this example of a specific embodiment of the subject of the invention, a solution of a method for remote detector of gaseous substances in the atmosphere according to the invention is described, which is shown in the FIGURE. It consists of the first laser 1 and the second laser 2, while at the intersection of the axes of their laser beams a semipermeable mirror 3 is located. Behind the semipermeable mirror 3, a totally reflecting mirror 5 is located in the forward direction of the laser beam advance generated by the second laser 2 and also in the reflected direction from the semipermeable mirror 3 of the laser beam advance generated by the first laser 1. The first aperture 4 is located in a forward direction from the semipermeable mirror 3 of the 50% laser beam advance from the first laser 1 and of the reflected 50% laser beam advance from the second laser 2. The second aperture 6 is located in the reflected direction from the totally reflecting mirror 5 of the 50% laser beam advance from the first laser 1 and of the 50% laser beam advance from the second laser 2. The device is complemented by a receiver 7 of reflected laser beams.

INDUSTRIAL USABILITY

The method for remote detection of gaseous substances in the atmosphere by the DIAL system with two lasers and a remote detector of gaseous substances in the atmosphere are usable in laser technology applications.

The method for remote detection of gaseous substances in the atmosphere by the DIAL system with two lasers is based on the fact that the laser beam generated by the first laser impinges on a semipermeable mirror, where 50% of the laser beam power passes through the semipermeable mirror and proceeds through the first aperture towards the target and at the same time the remaining 50% of the laser beam power reflects from the semipermeable mirror, impinges on a totally reflecting mirror from which it is reflected and is directed through the second aperture to the same target. The delayed laser beam generated by the second laser impinges on a semipermeable mirror, where 50% of the laser beam power passes through the semipermeable mirror, impinges on a totally reflecting mirror from which it is reflected and is directed through the second aperture to the same target and at the same time the remaining 50% of the laser beam power reflects from the semipermeable mirror and proceeds through the first aperture towards the same target.

With respect to FIG. 1, the remote detector of gaseous substances in the atmosphere by the DIAL system with two lasers consists of the first laser (1) and the second laser (2), while at the intersection of the axes of their laser beams a semipermeable mirror is located (3). Behind the semipermeable mirror (3), a totally reflecting mirror (5) is located in the forward direction of the laser beam advance generated by the second laser (2) and also in the reflected direction from the semipermeable mirror (3) of the laser beam advance generated by the first laser (1). The first aperture (4) is located in a forward direction from the semipermeable mirror (3) of the 50% laser beam advance from the first laser (1) and of the reflected 50% laser beam advance from the second laser (2). The second aperture (6) is located in the reflected direction from the totally reflecting mirror (5) of the 50% laser beam advance from the first laser (1) and of the 50% laser beam advance from the second laser (2).

The invention claimed is:

1. A method for remote detection of gaseous substances in an atmosphere by a differential absorption LIDAR (DIAL) system, comprising:
    causing a laser beam generated by a first laser of the DIAL system to impinge on a semipermeable mirror of the DIAL system, wherein 50% of laser beam power passes through the semipermeable mirror and proceeds through a first aperture of the DIAL system towards a target, wherein a remaining 50% of the laser beam power reflects from the semipermeable mirror and impinges on a reflecting mirror of the DIAL system from which it is reflected and is directed through a second aperture of the DIAL system to the target; and
    causing a delayed laser beam generated by a second laser of the DIAL system to impinge on the semipermeable mirror, wherein 50% of the laser beam power passes through the semipermeable mirror and impinges on the reflecting mirror from which it is reflected and is directed through the second aperture to the target and a remaining 50% of the laser beam power reflects from the semipermeable mirror and proceeds through the first aperture towards the target; and
    based at least in part on causing the delayed laser beam to impinge on the semipermeable mirror, remotely detecting the gaseous substances in the atmosphere.

2. The method of claim 1, wherein the first aperture and the second aperture are part of the DIAL system and the laser beam from the first laser and the laser beam from the second laser are not merged via a single aperture.

3. The method of claim 1, further comprising:
    dividing the first laser beam from the first laser into two beams; and
    dividing the second laser beam from the second laser into two beams.

4. The method of claim 3, further comprising directing the two beams from the first laser and the two beams from the second laser in parallel.

5. The method of claim 1, further comprising placing the first laser and the second laser with respect to each other such that an intersection of axes of the laser beam from the first laser and the laser beam from the second laser includes the semipermeable mirror.

6. The method of claim 1, further comprising positioning the first aperture and the second aperture such that, when the first aperture is blocked, detection capability and DIAL system sensitivity are preserved.

7. The method of claim 1, further comprising:
dividing the first laser beam from the first laser into two beams; and
dividing the second laser beam from the second laser into two beams until power density of the first laser beam and the second laser beam is reduced.

8. A remote detector of gaseous substances in an atmosphere by a differential absorption LIDAR (DIAL) system, the remote detector comprising:
a first laser of the DIAL system;
a second laser of the DIAL system;
a semipermeable mirror of the DIAL system positioned at an intersection of axes of laser beams from the first laser and the second laser;
a reflecting mirror of the DIAL system positioned behind the semipermeable mirror and located in a forward direction of a laser beam advance generated by the second laser and also in a reflected direction from the semipermeable mirror of the laser beam advance generated by the first laser;
a first aperture of the DIAL system located in a forward direction from the semipermeable mirror such that 50% of the laser beam advance from the first laser passes through the semipermeable mirror and impinges on the reflecting mirror and 50% of the laser beam advance from the second laser is reflected; and
a second aperture of the DIAL system located in the reflected direction from the reflecting mirror such that 50% of the laser beam advance from the first laser and 50% of the laser beam advance from the second laser are reflected and the first aperture and the second aperture are positioned to remotely detect the gaseous substances in the atmosphere.

* * * * *